Feb. 6, 1962  R. H. PANNIER  3,019,766
LIVESTOCK FEEDER

Filed July 30, 1958  3 Sheets-Sheet 1

Richard H. Pannier
INVENTOR.

Feb. 6, 1962 R. H. PANNIER 3,019,766
LIVESTOCK FEEDER
Filed July 30, 1958 3 Sheets-Sheet 2
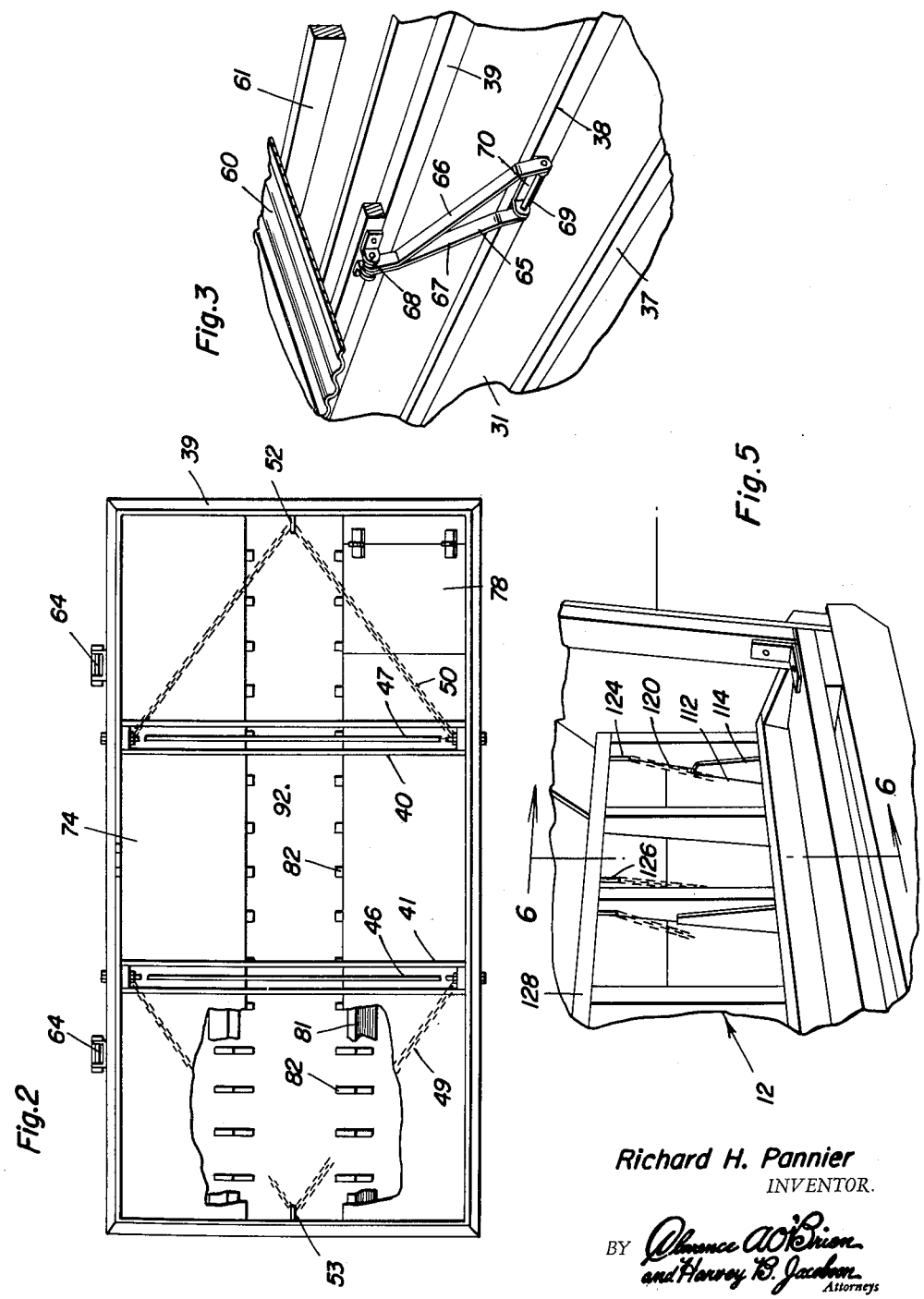
Richard H. Pannier
INVENTOR.

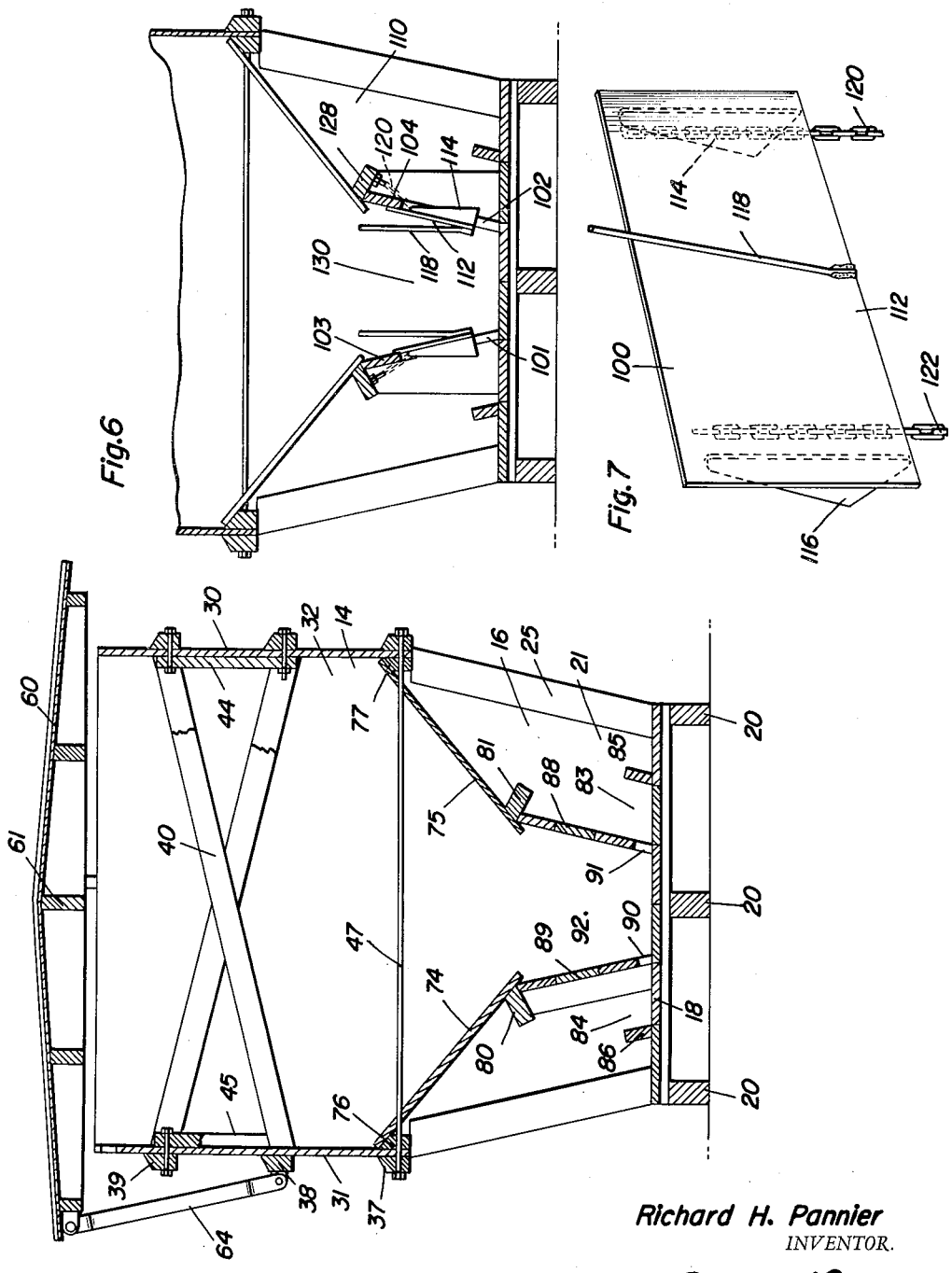

United States Patent Office 3,019,766
Patented Feb. 6, 1962

3,019,766
LIVESTOCK FEEDER
Richard H. Pannier, McLean, Ill.
Filed July 30, 1958, Ser. No. 751,996
4 Claims. (Cl. 119—53.5)

This invention relates to livestock feeders and more particularly to hog feeders.

An object of the invention is to provide a feeder which serves several purposes. A feeder constructed in accordance with this invention serves the purpose of a storage bin and a feeder. It is intended that the feeder save labor by less time of filling. The feed is moved only once; from the feed mill directly to the hogs. Without such a feeder, only a part of a truck load of feed can be put before the hogs. The rest has to be stored in other bins or sacks and then taken out to the smaller feeders at a later date. A feeder constructed in accordance with the invention bypasses the bulk bins that are now used, saving time, effort and money.

A further object of the invention is to provide a hog feeder that is especially useful for ground feed and to provide a slightly altered feeder that is principally useful for shelled corn or pellet feed.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 2 is a top view of the feeder in FIGURE 1, the top of the feeder removed to show internal detail of construction.

FIGURE 3 is a fragmentary perspective view showing a hinge for the top of the feeder.

FIGURE 4 is a transverse sectional view of the feeder in FIGURE 1.

FIGURE 5 is a fragmentary perspective view of a modification that is used principally for ground feed.

FIGURE 6 is a sectional view taken on the line 6—6 of FIGURE 5.

FIGURE 7 is a perspective view of an agitator used in the modification of FIGURE 5.

Figure 1:
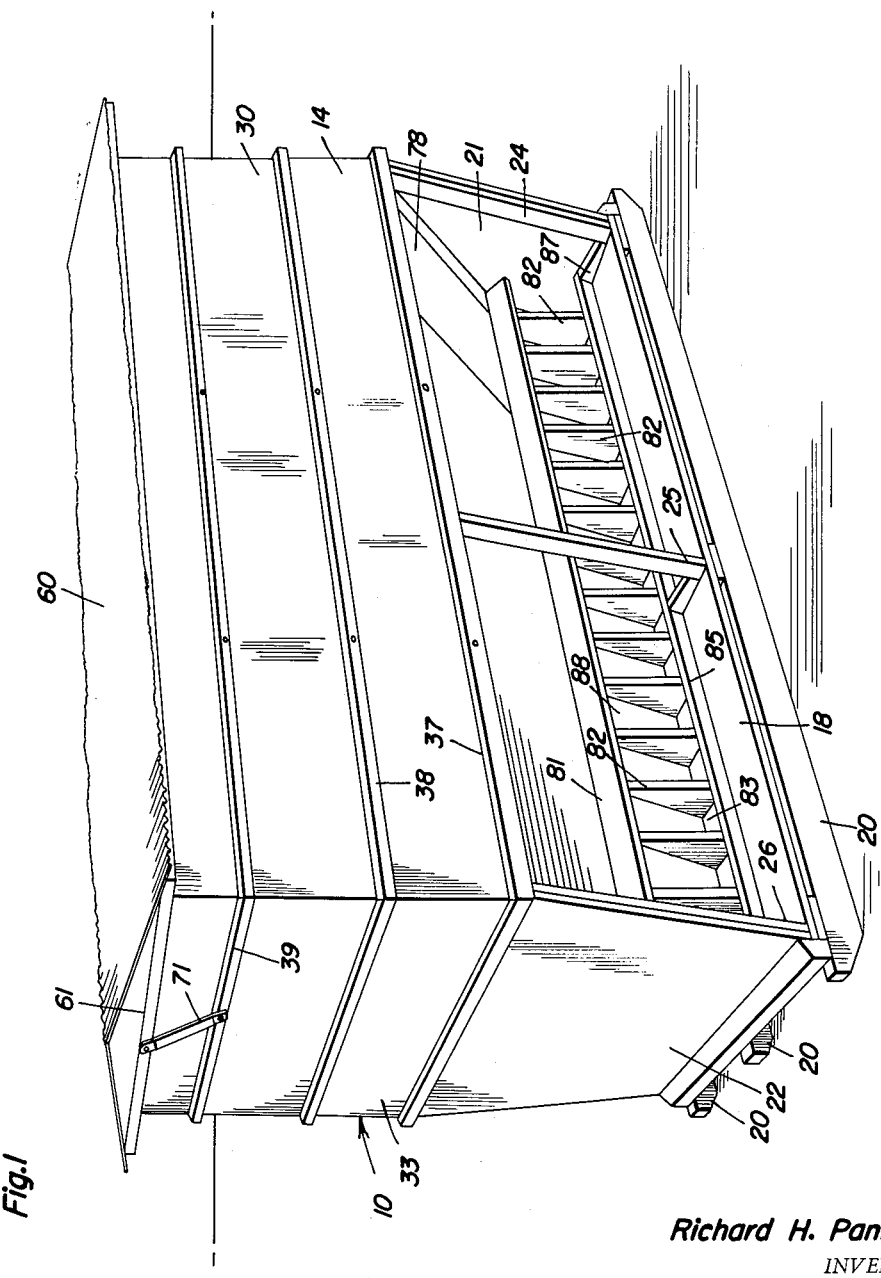
FIGURE 1 is a perspective view of a hog feeder made especially for shelled or pellet feed.

In the accompanying drawings there are two feeders 10 and 12 respectively. Reference is first made to feeder 10 which is shown in more detail. It has a large storage bin 14 disposed above and structurally supported by the feeding section 16. The feeding section has a bottom 18 supported by skids 20. The skids can be of any size depending on the size of the feeder and can be in any number. The feeding section 16 has end walls 21 and 22 attached to bottom 18 and rising upwardly therefrom. It also has braces 24, 25 and 26 attached to the bottom 18 and angled upwardly and outwardly slightly. There are two sets of braces 24, 25 and 26, one being on each of the sides of the feeder. These braces and the walls 21 and 22 support bin 14, the latter having front and rear walls 30 and 31 together with end walls 32 and 33 which can be made as continuations of walls 21 and 22 or can be made separate depending on the desires of the manufacturer. Reinforcing battons 37, 38 and 39 extend around the outside of the bin 14 and are bolted or otherwise fastened in place. The size and capacity of the bins can be altered by making the walls vertically higher or lower. Since the feeder 10 is adapted to hold a large supply of feed, there are one or more, preferably two sets 40 and 41 of crossed braces extending between walls 30 and 31 and secured to blocks 44 and 45 that are secured to the inside surfaces of walls 30 and 31. Transverse stay rods 46 and 47 (FIGURE 2) can be used in addition to the crossed braces. The stay rods can be substituted by chains or cables. In any event, they are anchored to the sides 30 and 31 to serve a supporting function. The same holds true for chains 49 and 50. These are secured at their ends to the side walls 30 and 31 and secured to the end walls, for instance by passing through eyes 52 and 53 that are secured to these end walls.

The top 60 of feeder 10 is made of one or more roofing panels that are secured to essentially flat frames 61, the roofing panels having a slight pitch for water drainage. The frame 61 is constructed in accordance with sound carpentry techniques and is attached to bin wall 31 by two hinges 64 and 65. The hinge 65 is shown in detail in FIGURE 3 and is made of a pair of offset arms 66 and 67 with a pivot assembly 68 at their upper ends and attached to the rear frame member of frame 61. The lower ends of arms 66 and 67 are spaced apart and attached to pivot pin 69, the latter being carried by mounting brackets 70 attached to batton 38. Each hinge is made in the same way enabling the top of the bin to be swung rearwardly as constrained in its movement by side links 71, there being one link attached to each end of frame 61 and to the uppermost batton 39. Accordingly, the top of the bin can be swung up and back to a slightly over-vertical-center position at which it can remain for loading the bin 14.

Feeding section 16 is made up of two inwardly and downwardly inclined panels 74 and 75 whose upper edges are supported on strips 76 and 77 attached to walls 30 and 31 and disposed on the two groups of braces 24, 25 and 26. Access door 78 is hinged in an opening in panel 75. The lower edges of the panels 74 and 75 are attached to longitudinal stringers 80 and 81 that are secured to the walls 21 and 22 of the feeding section. Stringers 80 and 81 are supported by vertical partitions and braces 82 that rise upwardly from the bottom of feeding trough 83 and 84 respectively. The bottom of each feeding trough is made by a portion of bottom 18 and by two strips 85 and 86 attached to bottom 18 and reinforced at their ends by blocks 87. The inner walls 88 and 89 of the feeding troughs are inclined inwardly and downwardly toward the longitudinal center line of the feeder and can be made of planks or panels that are secured to combined partitions and braces 82. Feed discharge openings in the form of elongate slots 90 and 91 at the lower parts of panels 88 and 89, permit feed to flow through the throat portion 92 of the feeding section and into the feeding trough 83 and 84. If found desirable an inverted V-shaped baffle can be attached to the bottom 18 between and slightly spaced from slots 90 and 91.

Reference is now made principally for FIGURES 5–7 where there is a modification of the feeder that is adapted to handle granular feed. The main distinction between this embodiment and the previously described embodiment is that agitators 100 are used in the feed discharge slots 101 and 102 at the bottoms of panels 103 and 104 in the feeding section 110, the other structure being the same as in FIGURES 1–4. Each agitator is made of a panel 112 (FIGURE 7) preferably of metal and having a pair of brackets 114 and 116 extending from one of the flat surfaces thereof. One or more agitator rods 118, is attached to the agitator panel 112 and extends inwardly and upwardly toward the longitudinal center of the feeding section 110. Elongate flexible means, for instance chains 120 and 122 are secured to the upper parts of the panel 112 and are engaged in hooks 124 and 126 carried by and secured to stringer 128 which responds in construction and function to stringer 81 in FIGURE 4. By using chains 120 and 122 the selected link can be engaged in the hook 124 and 126 so that the effective length of the chains is altered in accordance with the necessities. This also mounts the agitator panel 112 so that it is capable of floating inwardly against the grain in the throat 130 of the feeding section 110. The edges of the panel 112 fit flush against the inside surface of panel 104 so that the force of the granular feed presses the panel in place but the hogs can push it inwardly slightly to agitate the grain. This agitation is enhanced by rod 118 working the grain in the throat of the feeding section 110.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a hog feeder having a bin with a feeding section beneath said bin together with means supporting said bin above said section, a floor, a part of said floor constituting the bottom of said feeding section, said feeding section including a pair of inwardly and downwardly inclined panels, lower inwardly and downwardly inclined panels beneath said first mentioned panels and having discharge slots at the lower portions thereof through which feed is adapted to pass, said slots opening through the lower panels, feeding troughs adjacent to said slots and in registry therewith so that feed passing through said slots enters said feeding troughs, vertical partitions disposed in the troughs, agitators in said slots for the feed in the throat of said feeding section, said agitators each including a flat panel with portions generally aligned with the inside surface of one of said lower panels, an agitating rod constituting a part of said agitator and protruding into the throat of said feeding section, and means floatingly and vertically adjustably mounting said agitator panel in one of said slots, said agitator panel including means guidingly engaging said partitions.

2. The feeder of claim 1 wherein said agitator mounting means includes a pair of chains attached to said agitator panel, and means engageable with a selected link of each of said chains to hang said agitator panels in said slot for movement by the hogs as they are feeding from the feeding trough.

3. The feeder of claim 2 wherein said means supporting said bin above said feeding section include a plurality of braces attached to said floor and on which at least two of the sides of said bin are supported, and said braces also supporting the first mentioned panels.

4. A livestock feeder comprising a bin including parallel vertical side walls, parallel vertical end walls, means rigidly interconnecting the side walls intermediate the ends thereof, a closure for the top of said bin, over-center hinge means mounting the closure on the bin whereby the closure may move from a horizontal position overlying and closing the bin to a vertical position alongside of one side wall of the bin, a feeder section underlying the bin, said feeder section including a bottom member, a plurality of support means extending between the bottom member and the bin for supporting the bin in vertically spaced relation to the bottom member, said bin including a pair of inwardly extending panels forming a partial bottom on the bin with the panels having free edges in spaced relation to each other and in vertically spaced relation to the bottom member of the feeder section, downwardly extending panel members converging toward each other and having the upper edge thereof engaged with the outer surface of said inclined panels adjacent the free edge thereof, said panel members disposed in spaced relation to each other and forming a throat section for the feeder, the lower edges of said panel members being spaced from the bottom member for forming a discharge opening for feed, said bottom member extending laterally beyond the panel members, a plurality of vertical partitions mounted exteriorly of the panel members and dividing the outer surface of the panel members into a plurality of sections, longitudinal upstanding members mounted on said bottom member in laterally outwardly spaced relation to the lower end of the panel members for retaining the feed adjacent the panel members, said longitudinal members being spaced inwardly from the outer edge of the bottom member, said support members being downwardly inclined in relation to the bin whereby the feed disposed inwardly of the longitudinal members will be protected by the bin, a plurality of agitator panels mounted on said panel member and disposed in said discharge openings, flexible means adjustably supporting the agitator panels from said inclined panels, and means on each agitator panel for guiding engagement with the partitions thereby orientating the agitator panels in desired position, and an upwardly extending agitator rod connected to each agitator panel extending into the throat section for agitating the feed material therein as livestock pivots the agitator panels.

References Cited in the file of this patent

UNITED STATES PATENTS

| 1,354,802 | Castner | Oct. 5, 1920 |
| 1,524,619 | Harrington | Jan. 27, 1925 |
| 1,701,338 | Rowles | Feb. 5, 1929 |
| 2,234,112 | Emrick | Mar. 4, 1941 |
| 2,525,385 | Uhrenholdt | Oct. 10, 1950 |
| 2,640,464 | Jindrich | June 2, 1953 |